A. McNAB.
TAIL SHAFT MOUNTING.
APPLICATION FILED AUG. 26, 1918.
1,315,677.
Patented Sept. 9, 1919.
2 SHEETS—SHEET 1.
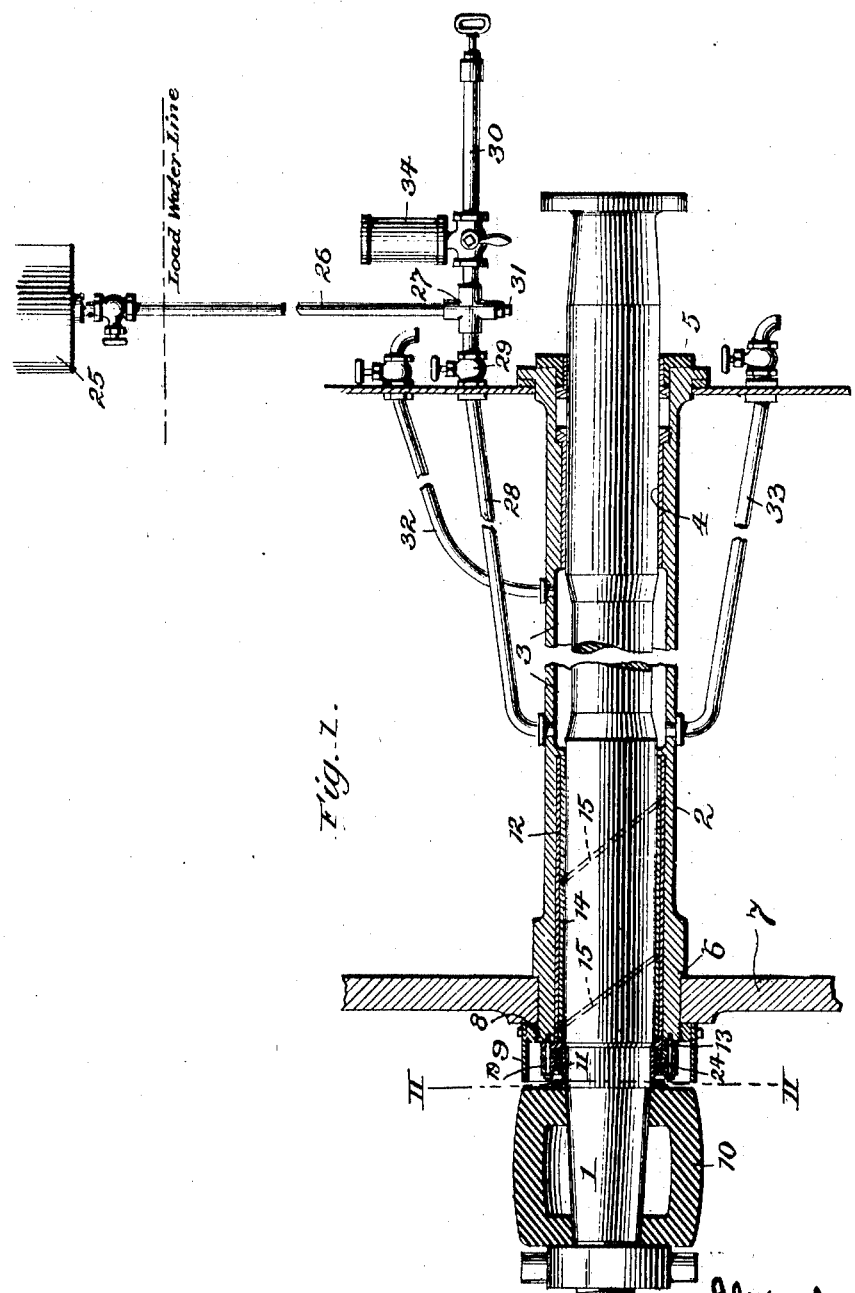

A. McNAB.
TAIL SHAFT MOUNTING.
APPLICATION FILED AUG. 26, 1918.
1,315,677.
Patented Sept. 9, 1919.
2 SHEETS—SHEET 2.
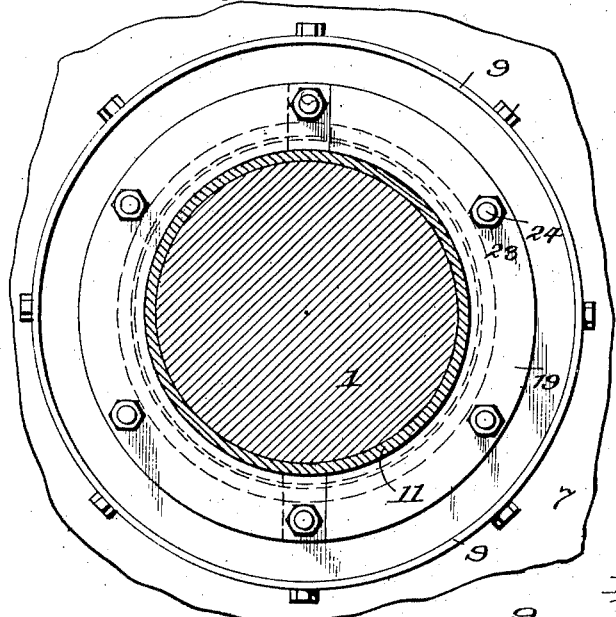
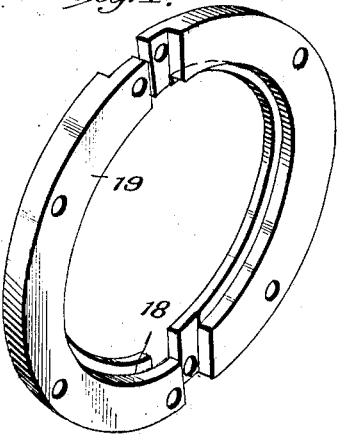
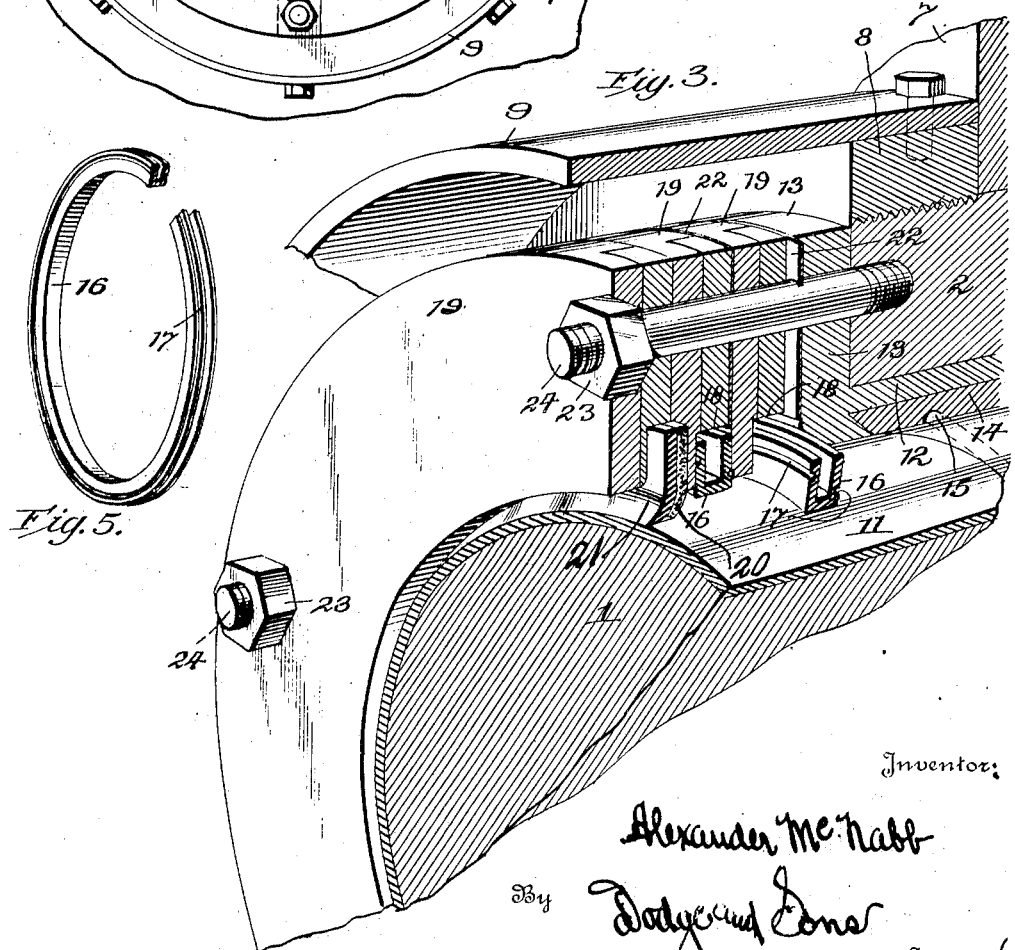
Inventor:
Alexander McNabb
By Dodge and Sons
Attorneys

UNITED STATES PATENT OFFICE.

ALEXANDER McNAB, OF BRIDGEPORT, CONNECTICUT.

TAIL-SHAFT MOUNTING.

1,315,677.  Specification of Letters Patent.  Patented Sept. 9, 1919.

Application filed August 26, 1918. Serial No. 251,518.

*To all whom it may concern:*

Be it known that I, ALEXANDER McNAB, a subject of the King of Great Britain, residing at Bridgeport, in the county of Fairfield and State of Connecticut, have invented certain new and useful Improvements in Tail-Shaft Mountings, of which the following is a specification.

My present invention pertains to an improved tail shaft mounting and more particularly to the means employed for lubricating the same.

It has been common practice for many years to lubricate the tail shaft bearing with salt water, and there has generally been employed in the make up of such bearings, liners of lignum-vitæ. Salt water is not a good lubricant and means have been devised to displace the same by oil and such efforts have met with more or less success. At the present time, however, lignum-vitæ is scarce and in fact practically unobtainable in such quantity as to meet the demands of ship building.

The present invention has for its object the production of a tail shaft bearing which will afford ample and satisfactory lubrication by oil, and one, which, furthermore, does away with the necessity of the employment of lignum-vitæ bushings or liners.

The invention is illustrated in the annexed drawings, wherein:

Figure 1 is a sectional elevation of the tail shaft and bearing and the means employed to effect lubrication;

Fig. 2 a transverse sectional view on the line II—II of Fig. 1, on an enlarged scale;

Fig. 3 a sectional perspective view illustrative of the oil retaining rings, outboard washer, and their retaining elements;

Fig. 4 a perspective of one of the retaining elements; and

Fig. 5 a similar view of one of the oil retaining rings, the ring being broken away in part.

In the drawings, 1 denotes the tail shaft and 2 the stern tube. The shaft is reduced in diameter for a slight distance between its ends, and the tube is also cut away upon its inner face, at such point forming a lubricant receiving pocket or recess, denoted by 3. A liner 4 is located inwardly of the pocket and a packing gland 5 is placed at the inboard end of the tube 2. Said tube has a shoulder, as at 6, abutting the vessel hull 7 and extending outwardly through an opening formed therein. The extreme end is exteriorly threaded and a nut 8 is turned up thereon drawing the tube tightly to place and a two-part rope guard 9 is secured to said nut. A propeller, the hub 10 of which is shown, is fitted on the outboard end of the tail shaft in the usual manner.

Secured to the inner face of the hub is a shield or sleeve-like member 11, said shield making a close fit with the tail shaft and preferably having its inner end beveled and contacting a reversely beveled shoulder on the shaft. A sleeve shaped bushing 12 is fitted within the tube 2, said bushing having a collar or flange 13 adapted when the parts are positioned to abut the outer end of said tube. The bushing carries a liner 14 which latter is provided upon its inner face with a spirally disposed oil groove 15 which at its inner end opens into chamber 3, the outer end of the groove, however, terminating short of the end of the liner. Located outwardly of the flange 13 and having a tapping or driven fit on the shield or sleeve 11, or on the tail shaft if the sleeve be omitted, as it may be, is a series of rings 16 (though one alone might be used) said rings by preference being substantially U-shaped in cross-section and having an oil groove 17 (one or more) in their outer vertical faces. Each of said rings runs in a groove 18 formed in a two-part collar 19, shown in detail in Fig. 4. A composite washer composed preferably of a felt element 20 and a composition (rubber) element 21 is placed outboard of the rings 16 and is held by a third collar 19. The innermost collars 19 are preferably separated from each other by thin sheets of paper 22 and all of said collars are drawn to place and so held by nuts 23 screwed upon studs 24 which are tapped into the outer end of shaft 2. The collars 19, as will be seen upon reference to Fig. 4, are provided with holes through which the studs extend, the holes in the overlapping ends being formed to register. The elements just described serve to prevent oil from being forced outwardly to any appreciable extent and likewise prevent ingress of water into the bearing along the shaft. Lubricant supplied to chamber 3, of course, finds its way out along shaft 1, following groove 15, thence over shield 11 to the rings 16. It is preferable to initially supply the oil to the chamber under pressure and to that end I employ an arrangement such as shown in Fig. 1.

An oil reservoir 25 located above the load water line of the vessel has connected thereto a valved pipe 26 which terminates in a four-way fitting 27. A pipe 28 having a valve 29 extends from said fitting to the chamber 3 and serves to convey oil thereto. A pump is connected to another branch of fitting 27 and a plug 31 closes the opening in the remaining branch, said opening serving for the connection of an emergency water service. A valved air vent pipe 32 extends from the upper part of the chamber 3 and a similar drain or draw-off pipe 33 opens through the lower wall of the chamber.

When the various elements of the bearing are finally assembled they are, of course, oiled or lubricated; the oil reservoir is then filled and the vent pipe 32 opened, oil passing from the reservoir and filling the chamber. When it is filled, as will be evidenced by oil passing from pipe 32, the valve upon said pipe is closed. From time to time the drain pipe valve should be opened as should also the air valve. So also the pump should be operated at intervals to force the oil outwardly from the chamber 3 along the shaft and thus secure a flooding of the lubricating and packing elements. During such operation the reservoir 25 will be cut off and the oil withdrawn from the pump reservoir, denoted by 34. The static pressure exerted by the oil in the reservoir 25 is however all that is necessary under ordinary conditions to maintain proper lubrication.

If, for any reason, the oil lubrication should fail, plug 31 may be removed and a water line connected to fitting 27, and water forced therethrough to the shaft bearing, all valves excepting 29 at such time being closed.

What is claimed is:

1. In combination with a stern tube; a tail shaft extending therethrough; a ring U-shaped in cross section rotatable with the shaft; a fixed collar into which said ring extends and with which it coöperates; and a flexible washer located outboard of the collar and coöperating with the shaft to prevent outflow of lubricant and inflow of water along the shaft.

2. In combination with a stern tube; a tail shaft extending therethrough; a plurality of rings U-shaped in cross section rotatable with the shaft; split collars one for each ring secured to the tube; and a flexible washer located outboard of said collars and coöperating with the rings to prevent outflow of lubricant and inflow of water along the shaft.

3. In combination with a stern tube; a tail shaft extending therethrough; a plurality of rings U-shaped in cross section rotatable with the shaft outboard of the tube, each of said rings having an oil groove formed in its exterior side walls; a plurality of two-part collars secured to the outer end of the stern tube and making a working fit with said rings; an outer collar; and a flexible washer carried by said collar and coöperating with the rings to prevent outflow of lubricant and inflow of water along the shaft.

4. In combination with a stern tube; a tail shaft extending therethrough; a propeller mounted on the outermost end of the shaft; a collar secured to the propeller hub and extending inwardly along the shaft; a plurality of rings U-shaped in cross section mounted upon and rotatable with said collar, each of said rings having an oil groove formed in each of its side faces; a plurality of segmental collars, each collar having a recess to receive the underlying ring; an outermost segmental collar; a flexible washer carried by said collar and bearing directly upon the sleeve; and means for securing the segmental portions of said collars together and to the outer end of the stern tube.

5. In combination with a stern tube; a tail shaft extending therethrough, an oil-receiving chamber or space being formed between the two intermediate the ends of the shaft; means located at the outer end of the tube to prevent outward flow of oil along the shaft; a reservoir for lubricant; a connection between said reservoir and the oil space aforesaid; and a valved vent pipe opening into said chamber or space.

6. In combination with a stern tube; a tail shaft extending therethrough, an oil chamber or space being formed between said elements and intermediate the ends of the tube; means located at the outer end of the tube to prevent flow of oil outwardly beyond the end of the tube; means located at the forward end of the tube to prevent flow of oil outwardly therefrom; an oil reservoir; a valved connection extending from said reservoir to the chamber or space aforesaid; a valved vent pipe extending from said chamber; and a force pump connected into the line leading from the reservoir to the chamber.

In testimony whereof I have signed my name to this specification.

ALEXANDER McNAB.